US011882792B2

(12) United States Patent
Kraus et al.

(10) Patent No.: US 11,882,792 B2
(45) Date of Patent: Jan. 30, 2024

(54) WORK VEHICLE HAVING A CUTTER ASSEMBLY WITH A PRE-LOADED GEAR TRAIN AND METHOD OF CONTROLLING SAME

(71) Applicant: Deere & Company, Moline, IL (US)

(72) Inventors: Timothy J. Kraus, Blakesburg, IA (US); Austin J. Karst, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 473 days.

(21) Appl. No.: 17/155,334

(22) Filed: Jan. 22, 2021

(65) Prior Publication Data

US 2022/0232775 A1 Jul. 28, 2022

(51) Int. Cl.
*A01D 69/06* (2006.01)
*A01D 34/00* (2006.01)
(Continued)

(52) U.S. Cl.
CPC ........... *A01D 69/03* (2013.01); *A01D 34/006* (2013.01); *A01D 34/665* (2013.01); *A01D 34/76* (2013.01);
(Continued)

(58) Field of Classification Search
CPC .... A01D 69/03; A01D 34/006; A01D 34/665; A01D 34/76; A01D 34/80; A01D 69/06;
(Continued)

(56) References Cited

U.S. PATENT DOCUMENTS 2,902,875 A * 9/1959 Finally .................. B23D 39/00
74/661
5,430,997 A * 7/1995 O'Halloran ............ A01D 34/80
56/10.2 H
(Continued)

FOREIGN PATENT DOCUMENTS

DE 102011016286 A1 10/2012
EP 1002458 A1 5/2000
EP 3213621 A1 9/2017

OTHER PUBLICATIONS

Extended European Search Report and Written Opinion issued in European Patent Application No. 22151899.6, dated Jun. 27, 2022, in 09 pages.

*Primary Examiner* — Thomas B Will
*Assistant Examiner* — Julia C Tran
(74) *Attorney, Agent, or Firm* — KLINTWORTH & ROZENBLAT IP LLP

(57) ABSTRACT

A work vehicle for cutting crops includes a header a supported by a chassis of the work vehicle. The header includes a cutter assembly having a cutter bar frame supporting a series of rotary cutters arranged in a lengthwise direction. A gear train, having a first gear and a second gear, is coupled to the series of rotary cutters to transfer power thereto. A cutter control system includes a first motor coupled to the first gear of the gear train and a second motor coupled to the second gear of the gear train. A controller, including a processor and memory architecture, is operably connected to the first motor and the second motor to control operation thereof. The cutter control system drives the first gear at a first speed via the first motor and drives the second gear at a second speed via the second motor. The second speed is different than the first speed to pre-load the gear train into enmeshing engagement with each other in one rotational direction.

20 Claims, 12 Drawing Sheets

(51) Int. Cl.
*A01D 34/80* (2006.01)
*A01D 34/76* (2006.01)
*A01D 34/66* (2006.01)
*A01D 69/03* (2006.01)

(52) U.S. Cl.
CPC .............. *A01D 34/80* (2013.01); *A01D 69/06* (2013.01); *F15B 2211/4053* (2013.01)

(58) Field of Classification Search
CPC .............. A01D 34/664; A01D 41/1274; A01D 41/142; A01D 78/1057; F15B 2211/4053; F16H 25/2009; F16H 2057/122; F16H 55/18
See application file for complete search history.

(56) References Cited

U.S. PATENT DOCUMENTS

| | | | | |
|---|---|---|---|---|
| 5,463,852 | A | * | 11/1995 | O'Halloran .......... A01D 34/664 56/192 |
| 6,158,201 | A | * | 12/2000 | Pruitt .................... A01D 43/10 56/157 |
| 7,730,701 | B1 | * | 6/2010 | Ehrhart .................. A01D 34/80 60/431 |
| 8,297,033 | B2 | | 10/2012 | Pruit et al. |
| 8,656,694 | B2 | * | 2/2014 | Pruitt .................. A01D 43/105 56/16.4 R |
| 9,485,913 | B2 | | 11/2016 | Rosenbalm et al. |
| 9,668,415 | B2 | * | 6/2017 | Arndt .................... A01D 34/80 |
| 2009/0237026 | A1 | * | 9/2009 | Panaitescu .......... G05B 19/404 318/630 |
| 2012/0031064 | A1 | * | 2/2012 | Barnett ................. A01D 34/76 56/157 |

* cited by examiner

US 11,882,792 B2

WORK VEHICLE HAVING A CUTTER ASSEMBLY WITH A PRE-LOADED GEAR TRAIN AND METHOD OF CONTROLLING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles for cutting crop and, in particular, to the cutter assemblies thereof.

BACKGROUND OF THE DISCLOSURE

In the hay and forage industry, agricultural windrowers are configured to cut crop material from the ground and arrange the cut material in windrows for later processing (e.g., by a separate baler). A windrower may include a header having a wide cutter assembly thereon that extends across a path of travel of the machine. The cutter assembly includes an arrangement of gear-driven, rotary cutters that function to cut the crop material, with one or more motors (e.g., hydraulic motors) driving the gears. The cut crop material is then provided to a conditioner assembly in the header, which may act to crimp the crop after it is cut and redirect the crimped crop to form it into a uniform windrow.

SUMMARY OF THE DISCLOSURE

A work vehicle for cutting crop material is disclosed. The work vehicle includes a header supported by a chassis of the vehicle, with the header including a cutter assembly. The cutter assembly includes, in turn, a cutter bar frame, a series of rotary cutters mounted on the cutter bar frame and arranged in a lengthwise direction, and a gear train having gears coupled to the series of rotary cutters to transfer power thereto. The gear train having a first gear and a second gear. The work vehicle also includes a cutter control system having a first motor coupled to the first gear of the gear train to provide power to the gear train, a second motor coupled to the second gear of the gear train to provide power to the gear train, and a controller, including a processor and memory architecture, operably connected to the first motor and the second motor to control operation thereof. The cutter control system drives the first gear at a first speed via the first motor and drives the second gear at a second speed via the second motor, with the second speed being different than the first speed to pre-load the gear train into enmeshing engagement with each other in one rotational direction.

A method of controlling a cutter assembly in a header of a work vehicle for cutting crops is further disclosed. The method includes providing a cutter assembly having a series of rotary cutters coupled to a gear train having a first gear and a second gear and providing a first motor and a second motor to drive the first gear and the second gear, respectively, with the first and second motors operated by a controller. The method also includes driving the first gear at a first speed with the first motor and driving the second gear at a second speed with the second motor, with the first speed being different than the second speed to pre-load the gear train into enmeshing engagement with other in one rotational direction.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
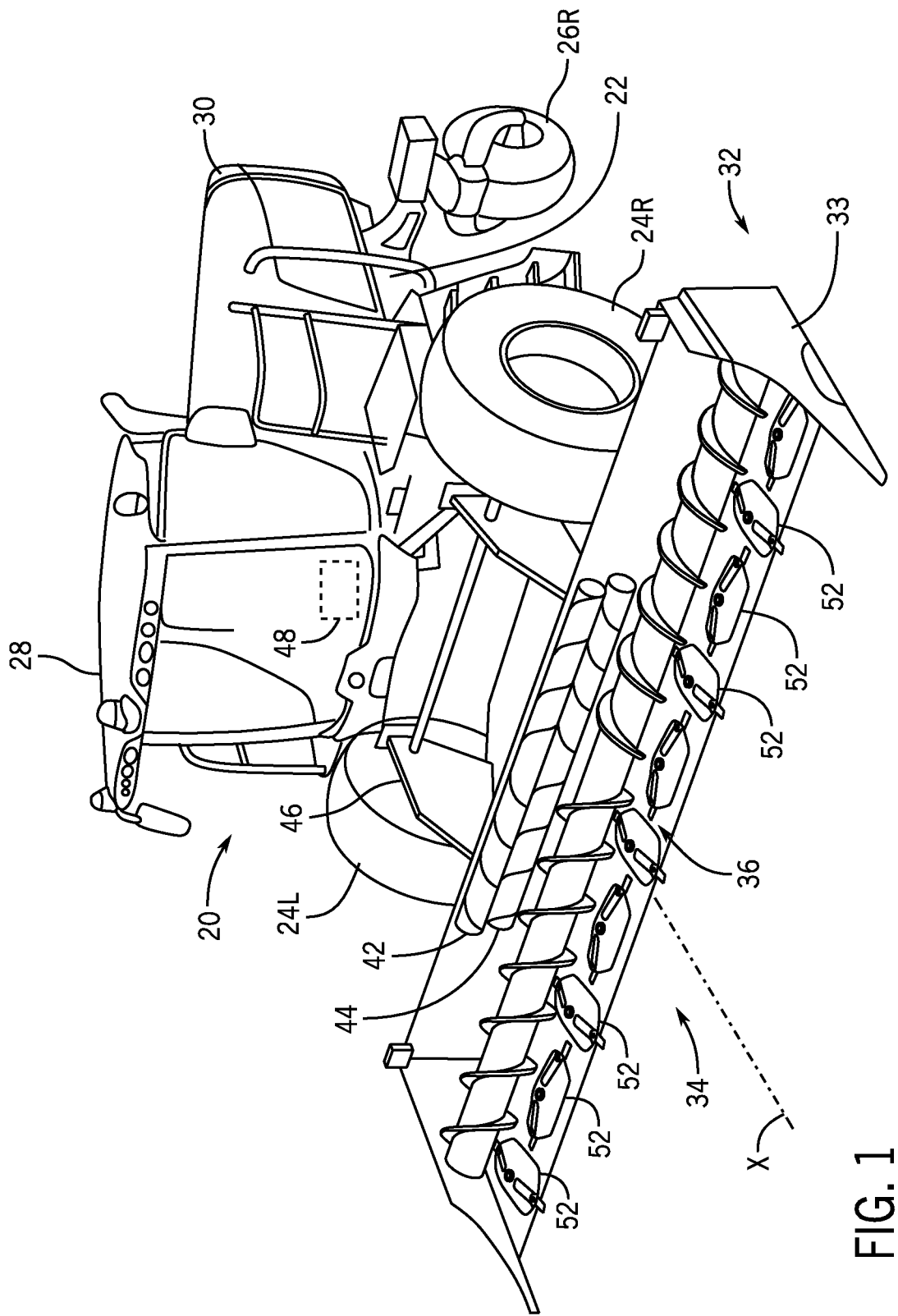
FIG. 1 is a perspective view of an example work vehicle in the form of a self-propelled windrower, with a top portion of a header housing removed, and that includes a cutter assembly and associated cutter control system, in accordance with an embodiment.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, agricultural windrowers include a header having a wide cutter assembly thereon that extends across a path of travel of the machine, with one common style of cutter assembly including an arrangement of gear-driven, rotary cutters that function to cut the crop material. The rotary cutters extend generally along a length of the cutter assembly, with a gear train coupled to the rotary cutters to provide a driving power thereto. In many cutter bar assemblies, the gear train is driven by a single motor from one end of the cutter assembly, but some cutter bar assemblies have a dual motor configuration where the gear train is driven from both ends of the cutter assembly. In either configuration, the gears in the gear train are designed to have "clearance" or "gear backlash" between the gear teeth, which is necessary to prevent jamming and provide for smooth rotation of the meshed gears, while also may minimizing noise and preventing overheating of the gears. Because there is backlash provided between the gear teeth, a gear can be rotated a slight amount relative to its adjacent gear. When a series of gears are put together, as with the gear train of the cutter assembly, the amount of rotational movement of the last gear in the drive train relative to the first gear can be significant.

The above-described relative motion between the gears may cause issues when the windrower is operated. That is, when the windrower is cutting crop, one end of the cutter assembly can be loaded more heavily than the other end. In a single motor embodiment, if the end furthest from the motor is loaded less heavily than the end nearest to the motor, the gears on the far end can "over-run" or turn slightly faster than the motor because they have momentum. When this happens, the gear teeth are momentarily loaded in the reverse rotational direction, and a frequent reversal in the gear loading direction will result in gear "chatter" in the gear train. In a dual motor embodiment, crop loading on the gear train can similarly cause the motors on each of the opposing ends of the cutter assembly to be alternately loaded more heavily than the other motor. This causes the gears to be loaded up in one rotational direction when a gear driven by the first motor on one end of the cutter assembly is turning faster than a gear driven by the second motor on the other end of the cutter assembly and causes the gears to be loaded up in the other rotational direction when the gear driven by the second motor turns faster than the gear driven by the first motor. Again, when this happens, the gear teeth are alternately loaded in differing directions, resulting in gear chatter. Undesirably, this gear chatter in the cutter assembly can cause the gears to wear out sooner than desired To prevent the gear train from being alternately loaded up in differing directions during operation and reduce the likelihood of gear chatter, a work vehicle cutter assembly with a pre-loaded gear train and an associated control method are provided. Specifically, a cutter control system operates to drive a first gear of the gear train at a first speed and drive a second gear of the gear train at a different second speed to generate torque wind-up on the gears, which causes the gears to remain biased in one rotational direction during operation of the cutter assembly. This torque wind-up or pre-loading of the gears inhibits the gears from alternately being loaded in different rotational directions during operation of the cutter assembly, thereby reducing or eliminating gear chatter and reducing the wear on the gears associated therewith.

According to example embodiments, the cutter control system operates to control first and second motors that drive the first and second gears, respectively. The cutter control system operates the second motor at a speed that is slightly lower than the speed of the first motor and maintains the second motor at a lower speed during operation to pre-load the gears of the gear train in one rotational direction.

In certain embodiments, the cutter control system is a hydraulic circuit that provides hydraulic oil to a first hydraulic motor and a second hydraulic motor of the cutter assembly, to drive the respective hydraulic motors. The hydraulic circuit controls the amount of hydraulic oil provided to the first and/or second hydraulic motors to controllably operate the first motor at a first speed and the second motor at a second speed, where the first speed is higher than the second speed. The first motor thereby operates to apply a main driving force to one end of the gear train while the second motor operates to apply a braking force to the other end of the gear train, with a torque wind-up being generated in the gear train to pre-load the gears thereof into enmeshing engagement with each other in one rotational direction (i.e., directionally pre-load the gears). The hydraulic circuit can control the amount of hydraulic oil provided to the first and/or second hydraulic motors via any of a number of hydraulic circuit arrangements, including by use of: an orifice or orifice valve that restricts hydraulic fluid flow to an inlet of one of the hydraulic motors, variable displacement pumps that selectively control hydraulic fluid flow to the hydraulic motors, and/or a priority valve that increases hydraulic fluid flow to an inlet of one of the hydraulic motors, as nonlimiting examples.

In other implementations, the cutter control system is an electric control system where motor drives provide a controlled power to a first electric motor and a second electric motor of the cutter assembly, to drive the respective electric motors. The motor drives operate through associated power electronics to control the voltage and/or current applied to the electric motors to controllably operate the first motor at a first speed and the second motor at a second speed, where the first speed is higher than the second speed. The first motor thereby operates to apply a main driving force to one end of the gear train while the second motor operates to apply a braking force to the other end of the gear train, with a torque wind-up being generated in the gear train to pre-load the gears thereof into enmeshing engagement with each other.

Example embodiments of a work vehicle with a cutter assembly and associated cutter control system according to this disclosure will now be described in conjunction with FIGS. 1-12. By way of non-limiting examples, the following describes the cutter assembly and cutter control system as incorporated into a self-propelled windrower. The following examples notwithstanding, the cutter assembly and cutter control system can be incorporated into other types of work vehicles, mower assemblies, or machines that include an elongated gear train therein and that could benefit from protection against gear chatter in the gear train. It is therefore recognized that aspects of the invention are not meant to be limited only to the specific embodiments described hereafter.

Example Embodiment(s) of a Work Vehicle with a Cutter Assembly Having a Pre-Loaded Gear Train With initial reference to FIG. 1, a self-propelled windrower 20 is illustrated that is operable to mow and collect standing crop in a field, condition the cut crop as it moves through the machine (e.g., to improve its drying characteristics), and then return the conditioned material to the field in a windrow or swath. The windrower 20 includes a main chassis 22 supported on driven right and left front wheels 24R and 24L, respectively and on right and left caster mounted rear wheels, of which only a right rear wheel 26R is shown. Carried on a forward end region of the chassis 22 is a cab 28. Mounted on the chassis 22 behind the cab 28 is a casing 30 within which is located a power source (not shown) such as an internal combustion engine. A harvesting header 32 is coupled so as to be supported by the forward end of the chassis 22. Operator controls (not shown) are provided in the cab 28 for operation of the windrower 20, including the attached harvesting header 32.

The harvesting header 32 includes an outer housing 33, a top portion of which is removed in FIG. 1 to illustrate various internal components of the header 32. Positioned within housing 33 is a cutter assembly 34 that delivers cut crop to a following crop converging auger 36 that directs crop rearward into a discharge passage for further processing by a crop conditioning arrangement including upper and lower crop conditioning rolls 42 and 44, respectively. Conditioned crop is expelled to the rear by the conditioning rolls 42 and 44 and is formed into a windrow by upright right and left, windrow forming panels (not shown) which are supported by a top wall of an open-bottomed frame 46 located between the front wheels 24R and 24L.

In certain embodiments, a controller 48 may also be provided. The controller 48 may be in electrical (or other) communication with various devices of the windrower 20, to control various aspects of the operation of the windrower. In particular, the controller 48 may communicate with components in header 32 to control operation of cutter assembly 34. The controller 48 may be configured as a computing device with one or more processors and memory architectures, as a hard-wired computing circuit (or circuits), as a hydraulic or electrohydraulic control device, and so on.

Figure 2:
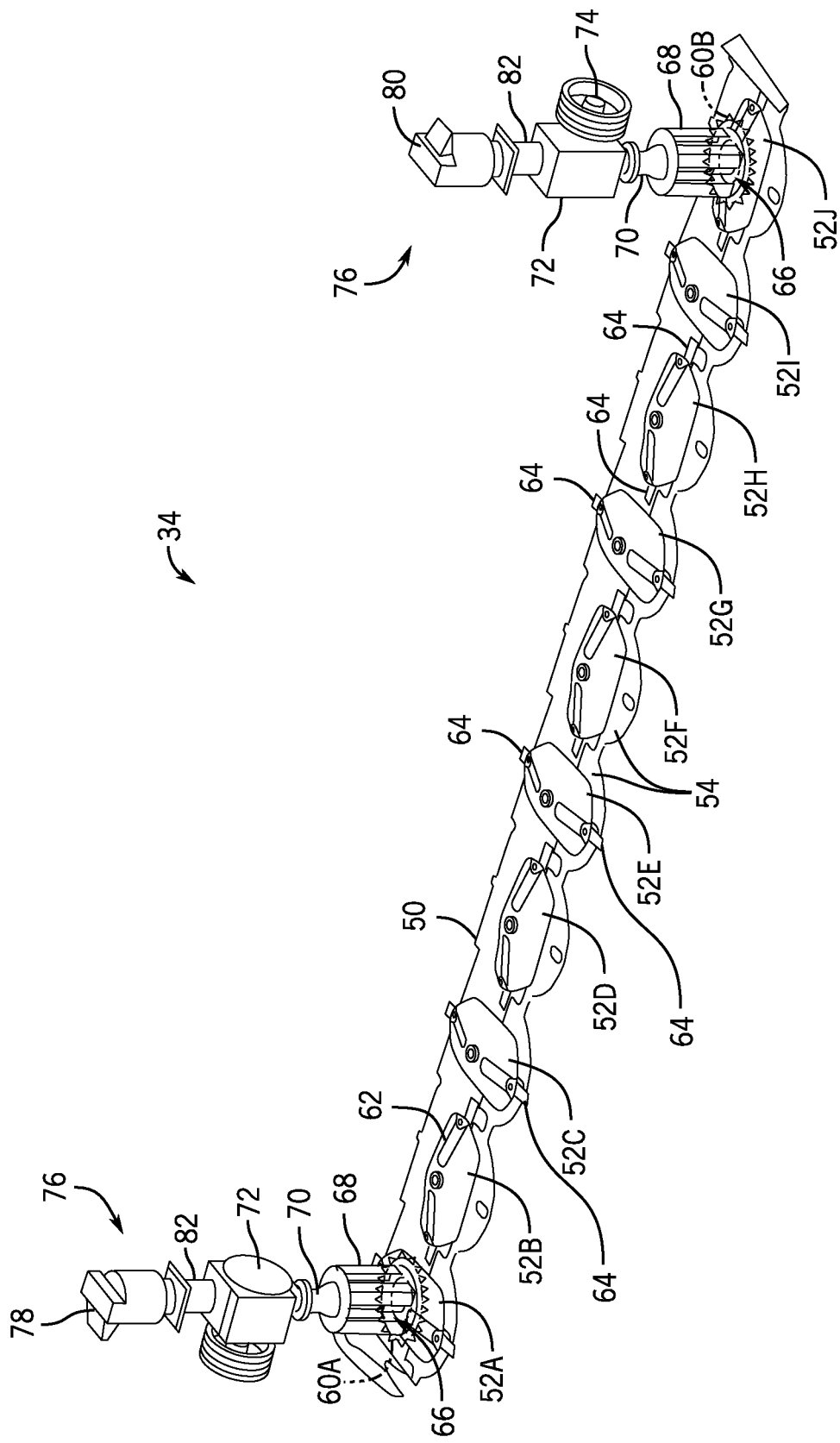
FIG. 2 is a perspective view of the cutter assembly included in the windrower of FIG. 1.
Figure 3:
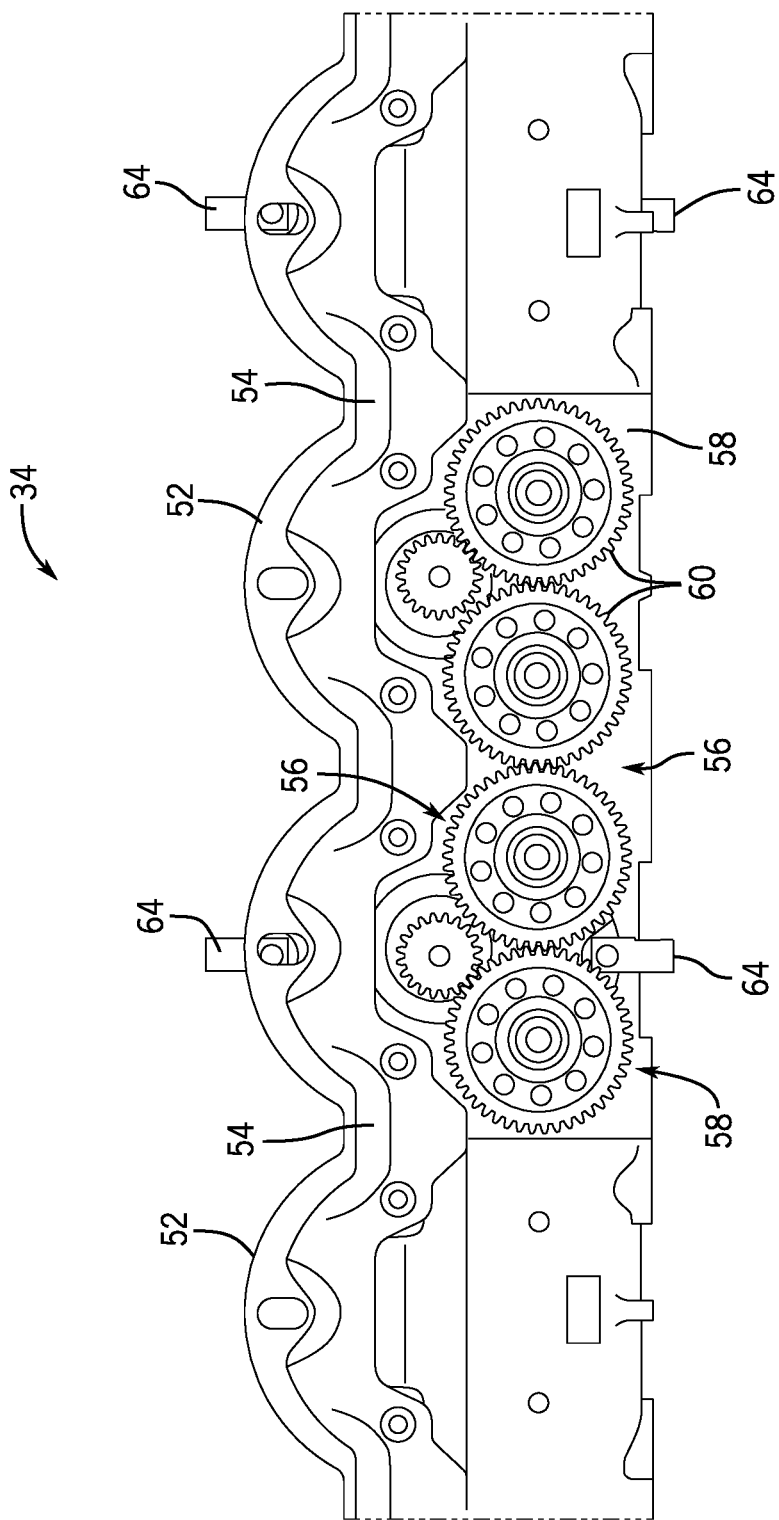
FIG. 3 is an underside view of a portion of the cutter assembly of FIG. 2, illustrating a portion of a gear train included in the cutter assembly.

As shown in greater detail in FIG. 2, the cutter assembly 34 includes a cutter bar frame 50 that forms a base of the assembly 34. Arranged along the cutter bar frame 50 is a series of rotary cutters 52 (e.g., ten cutters, as in FIG. 2) that extend across the path of travel of the windrower 20, with each cutter 52 being rotatable about its own upright axis. For the sake of convenience, the ten cutters 52 in FIG. 2 will be denoted by the letters (a)-(j), beginning with the left most cutter in the series as viewed from the front of the machine. The cutters 52 are rotatably supported on an elongated, flat gear case 54 that extends underneath the cutters 52 for the full length thereof, with the gear case 54 mounted to a top side of the cutter bar frame 50. The gear case 54 includes openings or pockets 56 therein, as shown in FIG. 3, and contains a train of flat spur gears—i.e., gear train 58 including gears 60—a portion of which is shown in FIG. 3. The gear train 58 extends the length of the cutter assembly 34, with the gears 60 operably engaged with one another to distribute driving power between one another and to the cutters 52(a)-52(j). Each of the cutters 52 includes a generally elliptical, formed blade carrier 62 and a pair of blades 64 mounted at opposite ends of the carrier 62. As shown in FIG. 2, all of the cutters 52 are ninety degrees out of phase with one another inasmuch as the circular paths of travel of the blades 64 of adjacent cutters 52 overlap one another and must be appropriately out of phase to avoid striking each other. Due to the positive mechanical drive connection between the group of rotary cutters 52 through the spur gears 60, such cutters 52 always remain properly in phase with one another.

A shaft assembly 66 is coupled to each of the outermost rotary cutters 52(a), 52(j) on opposing ends of the cutter assembly 34 and that projects upwardly from the cutter to define the axis of rotation thereof, with the outermost gears 60 of the gear train 58 driven by the shaft assemblies 66 for rotation therewith, as shown in phantom in FIG. 2. While shaft assemblies 66 are shown coupled to outermost rotary cutters 52(a), 52(j), it is recognized that the shaft assemblies 66 could be coupled to other rotary cutters, such as rotary cutters 52(b), 52(i), for example. Each shaft assembly 66 is centered within a cage 68 that provides protection thereto, such as by preventing crop from becoming wrapped up on the shaft assembly 66. Additionally, each shaft assembly 66 includes a lower universal joint (not shown) housed within the cage 68 that provides for coupling of the shaft assembly 66 to a drive shaft 70. The drive shaft 70 extends upward out of cage 68 and projects into a right-angle gearbox 72. Inside the gearbox 72, the drive shaft 70 operably connects with a horizontal output shaft 74 that ultimately drives the auger 36 and pair of conditioning rolls 42 and 44 (FIG. 1) via a belt and pulley drive and a transmission box.

According to example embodiments described in detail here below, a cutter control system is provided to selectively drive gears 60(a), 60(b) at opposing ends of the gear train at different speeds. The cutter control system is described as including a drive arrangement 76 with rotary motors 78, 80, along with an associated controller and control system or circuit (hydraulic or electrical circuit) that collectively operate to pre-load the gears 60 of the gear train 58, via driving of gears 60(a), 60(b) at different speeds. In various embodiments, the motors 78, 80 may be in various configurations, including hydraulic motors or electric motors, as primary examples, although mechanically driven motors are also envisioned.

More specifically, the drive arrangement 76 drives the shafts 70 at each of opposing ends of cutter assembly 34, along with the various components of the header 32 that derive power therefrom, including the rotary cutters 52 of cutter assembly 34. Each of the motors 78, 80 is carried on an elevated platform 82 that is coupled onto the topside of gearbox 72, so that the motors 78, 80 are disposed high above the crop handling region of the header 32. Projecting downwardly from each motor 78, 80 is drive shaft 70, which extends through platform 82 and into gearbox 72, before passing on down to the associated shaft assembly 66 and to the gear train 58 to transfer power thereto. The two motors 78, 80 cooperatively drive and share the load of all of the rotary cutters 52 of the cutter assembly 34, with the gear train 58 of the cutter assembly 34 receiving driving input power from the motors 78, 80. This means, for example, that the gear 60(a) (shown in phantom in FIG. 2) associated with the cutter 52(a) does not need to bear all the loading from the other gears in the gear train 58 since approximately one half that loading is directed to the gear 60(b) (shown in phantom in FIG. 2) associated with the rotary cutter 52(j) at the opposite end of the gear train 58.

In operation of the cutter assembly 34, it is recognized that it is desirable to drive the opposing ends of the gear train 58 (e.g., the outermost gears 60, to which shaft assemblies 66 are coupled) at different speeds, with a first gear 60(a) at one end and a second gear 60(b) at the other end driven at different speeds during operation of the windrower 20. That is, driving of second gear 60(b) at a speed that is lower than the speed of first gear 60(a)—or conversely driving of first gear 60(*a*) at a speed that is lower than the speed of second gear 60(*b*)—pre-loads the gears 60 of the gear train 58 into enmeshing engagement with each other in one rotational direction. Maintaining such a speed relationship between the gears 60(*a*), 60(*b*), such as maintaining gear 60(*b*) at a speed slower than gear 60(*a*), prevents the gears 60 from alternately being loaded in different directions during operation of the cutter assembly 34, thereby eliminating gear chatter and reducing wear on the gears 60.

In example embodiments described in further detail here below, motors 78, 80 are operated at different speeds to provide for the gears 60(*a*), 60(*b*) being driven at different speeds. That is, motor 80 is operated at a speed that is lower than the speed of motor 78—or conversely motor 78 is operated at a speed that is slightly lower than the speed of motor 80—to provide the differential speeds of gears 60(*a*), 60(*b*). It is recognized, however, that in alternative embodiments, the driving of the gears 60(*a*), 60(*b*) at different speeds could be achieved in manners other than via the operation of motors 78, 80 at different speeds. For example, motors 78, 80 could be run at the same speed, but with a reduction gear (not shown) positioned between one of the motors 78, 80 and its respective driven gear 60(*a*), 60(*b*) in the gear train 58 to result in one of the gears being driven at a slower speed.

Figure 4:
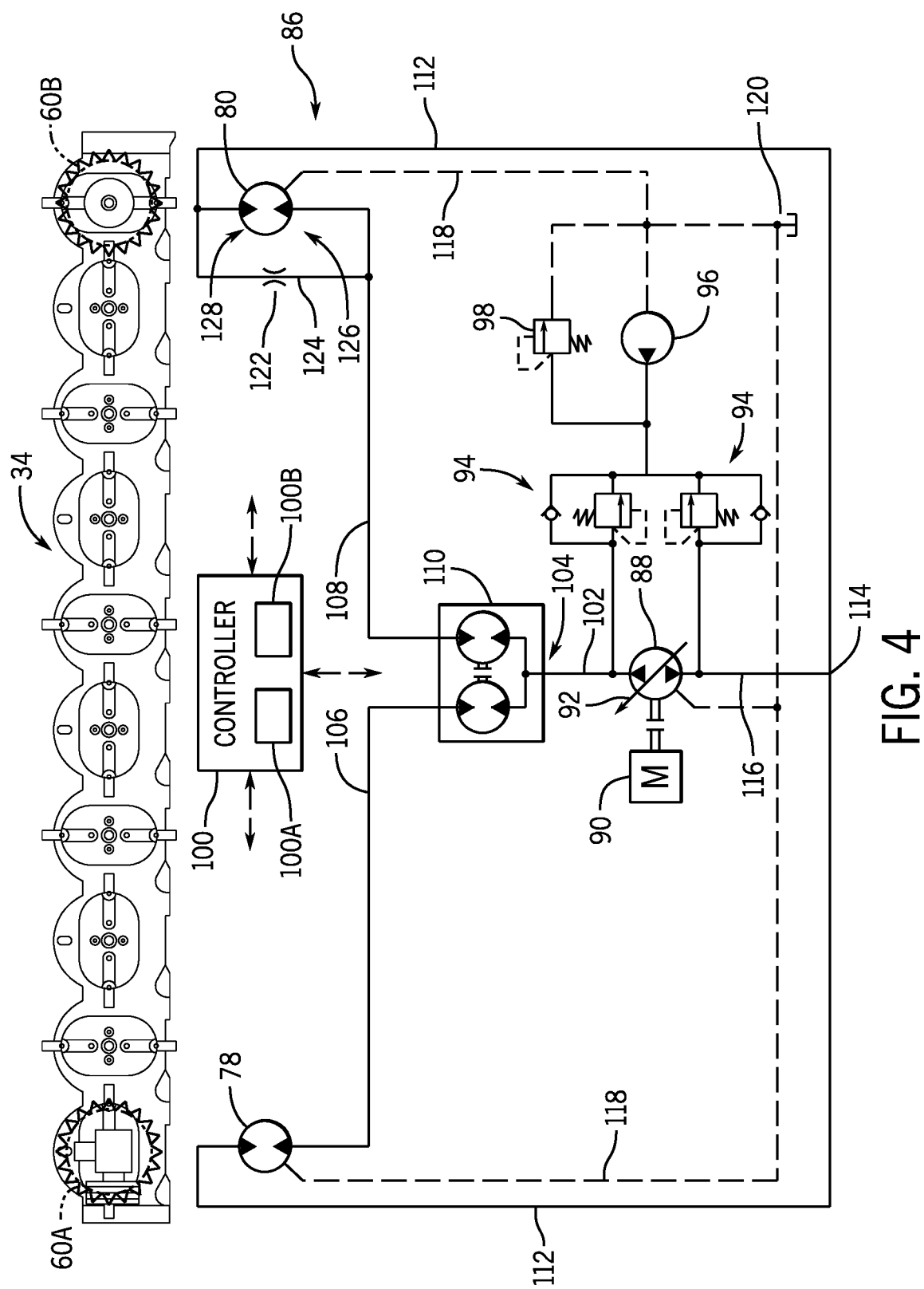
FIG. 4 is a schematic view of an example hydraulic circuit for a cutter control system associated with the cutter assembly of FIGS. 2 and 3.

In certain example embodiments, a cutter control system is provided in the form of a hydraulic circuit that drives a pair of rotary hydraulic motors 78, 80 in drive arrangement 76. Referring now to FIG. 4, and with continued reference to FIGS. 1-3, an example embodiment of a hydraulic circuit 86 is illustrated for controlling operation of the hydraulic motors 78, 80. The hydraulic circuit 86 is illustrated as a closed-loop, hydrostatic system and is operable by hydraulic fluid, i.e., hydraulic oil, to enable running of motors 78, 80 according to a desired operation. An onboard platform pump 88 is powered by a motor 90 (e.g., electric motor) that may be driven by the engine of the windrower 20 to provide for circulation of hydraulic oil within the circuit 86, with the platform pump 88 being mechanically driven by the motor 90. The platform pump 88 is preferably a pressure-compensated, load-sensitive pump that includes a swash plate 92 (denoted schematically for purposes of illustration by the arrow associated with the pump) that may be adjustably stroked or destroked to change its angular position and correspondingly adjust the output flow rate of oil therefrom as measured, for example, in gallons per minute. The variable flow output from platform pump 88 is achieved via electronic displacement control of the pump, with increases and decreases in the output flow providing more or less flow to the motors 78, 80 to adjust the speed of the rotary cutters 52 on cutter assembly 34. Other general components of the hydraulic circuit 86 include relief valves 94, a charge pump 96, and a charge pressure relief 98, consistent with as known in a hydrostatic hydraulic circuit.

A controller 100 is provided in hydraulic circuit 86 to control operation of selected components therein, with it understood that controller 100 could be incorporated into the controller 48 of FIG. 1 or provided as a separate controller. The controller 100 may be configured as computing devices with associated processor devices 100(*a*) and memory architectures 100(*b*), as hydraulic, electrical or electro-hydraulic controllers, or otherwise. As such, the controller 100 may be configured to execute various computational and control functionality with respect to the hydraulic circuit 86 and may be in electronic or hydraulic communication with various components therein. For example, in hydraulic circuit 86, controller 100 provides for variable flow output from platform pump 88 via electronic displacement control thereof, with increases and decreases in the output flow providing more or less flow to the motors 78, 80 to adjust the speed of the rotary cutters 52 on cutter assembly 34. In various embodiments, controller 100 may also communicate with actuators, sensors, valves and other devices within the hydraulic circuit.

In the hydraulic circuit 86, a high-pressure line 102 leads from the platform pump 88 to a tee connection 104, where one fluid path 106 leads to the motor 78 and another fluid path 108 leads to the motor 80. A mechanical-type flow divider 110 (e.g., rotary style flow divider) is positioned at tee connection 104 to divide a flow of hydraulic oil provided from platform pump 88. In the illustrated embodiment, the flow divider 110 operates to provide a 50-50 split of the hydraulic oil to the fluid paths 106, 108, such that equal amounts of hydraulic oil flow along the fluid paths toward the motors 78, 80. Return lines 112 lead from the motors 78, 80 back to another tee connection 114, with a single return line 116 going to the backside of the pump 88. A case drain line 118 is also connected to each of motors 78, 80 and leads to a reservoir 120 that stores low pressure hydraulic oil. Hydraulic oil from return lines 112 and case drain lines 118 flows into/through relief valves 94, charge pump 96, charge pressure relief 98 and reservoir 120 in a known manner to remove any oversupply of oil to the pump 88 and to provide cooling for the pump.

As shown in FIG. 4, to provide for differential operation of the motor 78 and the motor 80 in cutter assembly 34, hydraulic circuit 86 includes an orifice valve (or more generally an "orifice") 122 in fluid path 108 that operates to restrict or control the flow of hydraulic oil provided to the motor 80. The orifice 122 is positioned along a secondary fluid path 124 that is parallel to the motor 80 (i.e., positioned across motor 80), such that a portion of hydraulic oil in fluid path 108 is diverted from an inlet 126 of motor 80 to flow along the secondary fluid path 124 and through orifice 122, thereby bypassing motor 80 and being routed to join return line 112 at the outlet 128 of motor 80. In the illustrated embodiment, the orifice 122 provides a restricted flow therethrough in a fixed amount, such that the amount of hydraulic oil diverted from the inlet 126 of motor 80 remains unchanged during operation of the motors 78, 80 via hydraulic circuit 86. As an example, orifice 122 may be set such that the flow of hydraulic oil therethrough results in the flow of hydraulic oil to the inlet 126 of motor 80 being 5-10% less than the flow of hydraulic oil provided to motor 78. This diverting or restriction of hydraulic fluid to motor 80 results in the motor operating at a reduced speed as compared to motor 78, with the differential speed of motors 78, 80 resulting in the gears 60(*a*), 60(*b*) being driven at different speeds and the gears 60 of the gear train 58 being pre-loaded into enmeshing engagement with each other in one rotational direction to prevent gear chatter, as described in detail previously.

Figure 5:
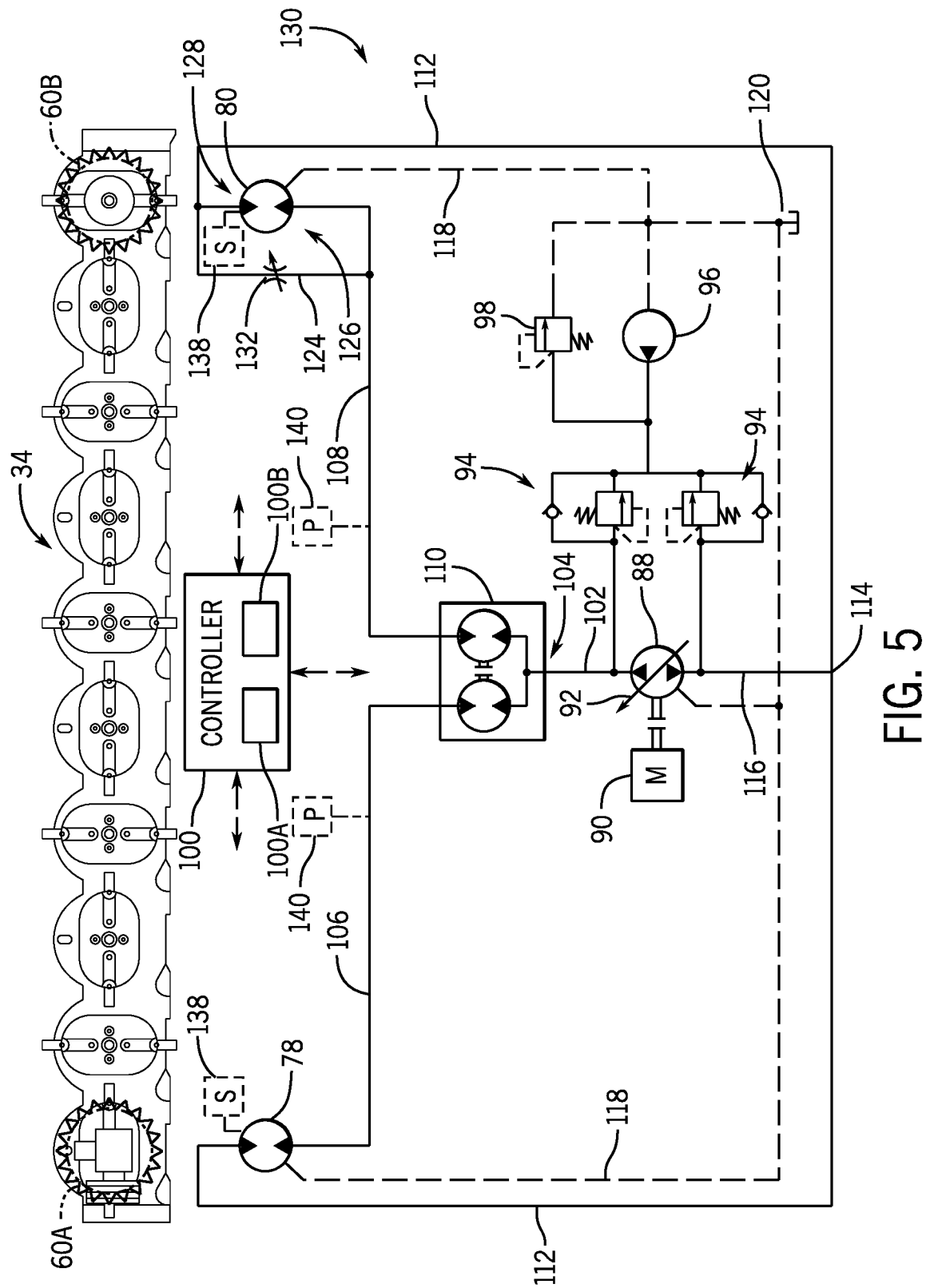
FIG. 5 is a schematic view of another example hydraulic circuit for a cutter control system associated with the cutter assembly of FIGS. 2 and 3.

Referring now to FIG. 5, a hydraulic circuit 130 is provided according to another embodiment. The hydraulic circuit 130 is substantially similar to the hydraulic circuit 86 of FIG. 4, and thus common components of the circuit are identified consistent with those in FIG. 4. In hydraulic circuit 130, the mechanical-type flow divider 110 divides a flow of hydraulic oil provided from platform pump 88 between fluid paths 106, 108, such that equal amounts of hydraulic oil flow along the fluid paths toward the motors 78, 80. In the embodiment of FIG. 5, a (variable) orifice valve 132 is positioned in fluid path 108 that operates to restrict the flow of hydraulic oil provided to the motor 80.

Specifically, the orifice valve 132 is positioned along a secondary fluid path 124 that is parallel to the motor 80, such that a portion of hydraulic oil in fluid path 108 is diverted from the inlet 126 of motor 80 to flow along the secondary fluid path 124 and through orifice valve 132, thereby bypassing motor 80 and being routed to join return line 112 at the outlet 128 of motor 80. The orifice valve 132 is configured to selectively restrict or control the flow of hydraulic oil therethrough by a desired amount and may be an electro-hydraulically controlled valve, for example.

Controller 100 of the hydraulic circuit 130 is operatively connected to the orifice valve 132 to adjust the valve and control the amount of hydraulic oil that flows therethrough. Adjustment of the orifice valve 132 may be performed responsive to inputs received by the controller 100 of one or more operational parameters that are measured during operation of the hydraulic circuit 130 and the motors 78, 80. For example, sensors may be included in hydraulic circuit that measure one or more of the speed of motors 78, 80 and pressure(s) within the hydraulic circuit (and the load on the motors 78, 80)—with speed sensors 138 and pressure sensors 140 generally indicated in dashed lines in FIG. 5, as non-limiting examples. The controller 100 may implement a transfer function that adjusts the orifice valve 132 responsive to these received inputs. For example, the controller 100 may adjust the orifice valve 132 as the cutter assembly 34 is loaded up on one side or as the load drops down. In a case where the load drops on motor 78 and the load rises on motor 80, for example, the controller 100 will open the orifice valve 132 by an increased amount in order that more hydraulic oil is diverted from motor 80, such that motor 80 continues to run slower than motor 78 and a directional pre-load on the gears is maintained in a constant fashion—i.e., so that motor 78 continues to provide a main driving force on gear train 58 and motor 80 provides a braking force. As an example, orifice valve 132 may be adjusted such that the flow of hydraulic oil therethrough results in the flow of hydraulic oil to the inlet 126 of motor 80 being maintained at 5-10% less than the flow of hydraulic oil provided to motor 78.

Figure 6:
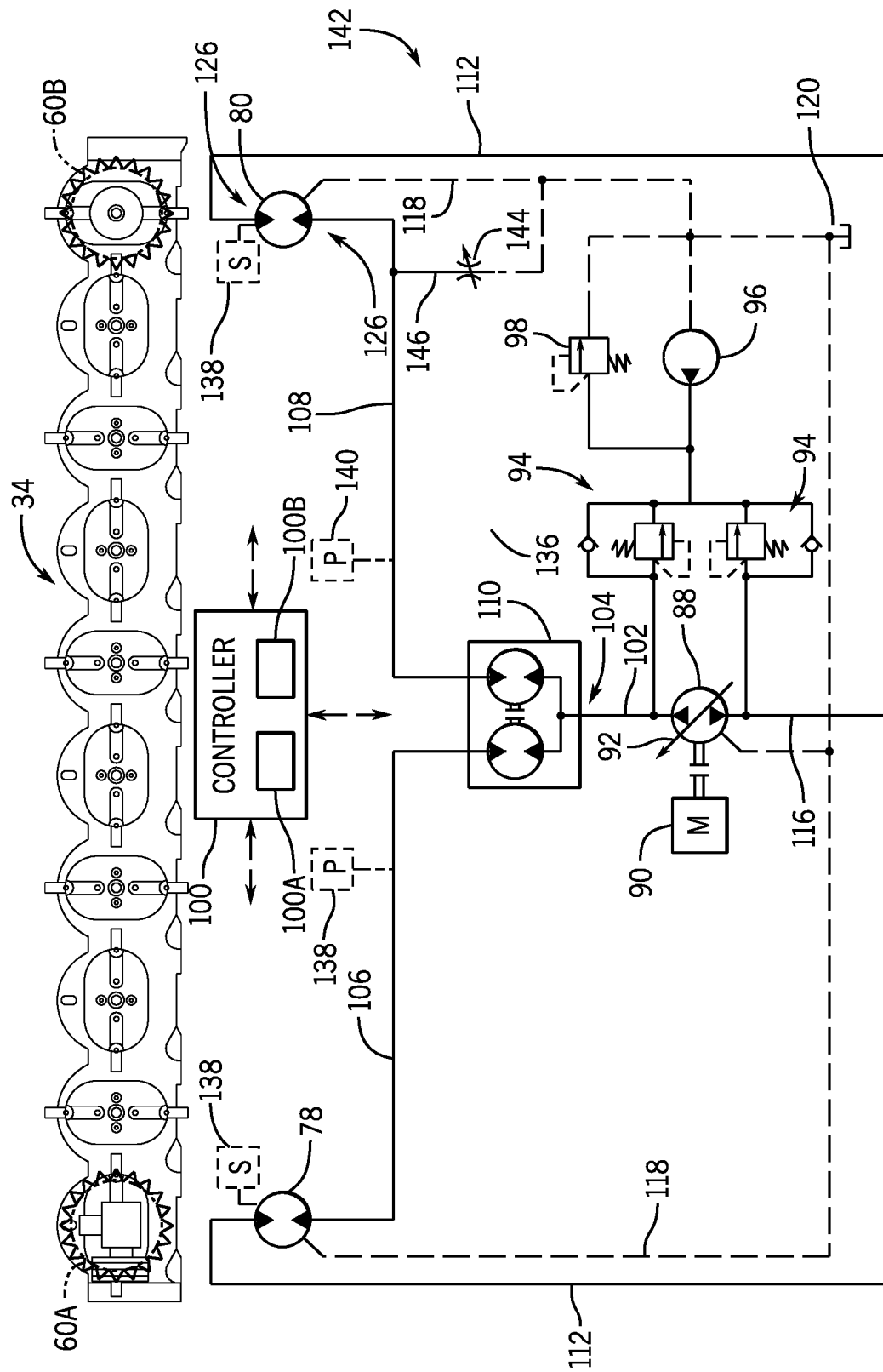
FIG. 6 is a schematic view of another example hydraulic circuit for a cutter control system associated with the cutter assembly of FIGS. 2 and 3.

Referring now to FIG. 6, a hydraulic circuit 142 is provided according to another embodiment. Again, the hydraulic circuit 142 is substantially similar to the hydraulic circuit 86 of FIG. 4, and thus common components of the circuit are identified consistent with those in FIG. 4. In hydraulic circuit 142, the mechanical-type flow divider 110 divides a flow of hydraulic oil provided from platform pump 88 between fluid paths 106, 108, such that equal amounts of hydraulic oil flow along the fluid paths toward the motors 78, 80. In the embodiment of FIG. 6, a (variable) orifice valve 144 is positioned in fluid path 108 that operates to restrict the flow of hydraulic oil provided to the motor 80. The orifice valve 144 is positioned along a bypass fluid path 146 that is parallel to the motor 80, with a portion of hydraulic oil in fluid path 108 being diverted from the inlet 126 of motor 80 to flow along the bypass fluid path 146 and through orifice valve 144, thereby bypassing motor 80 and being routed or dumped directly into the case drain line 118 and back to reservoir 120.

Similar to the orifice valve 132 of FIG. 5, the orifice valve 144 is configured to selectively restrict or control the flow of hydraulic oil therethrough by a desired amount. In one embodiment, the orifice valve 144 is an electronically controlled valve in operable communication with controller 100. The controller 100 operates to adjust the orifice valve 144 responsive to inputs thereto of one or more operational parameters (motor speed, hydraulic circuit pressure(s), etc.), with a transfer function of the controller 100 adjusting the orifice valve 144 responsive to these received inputs. As an example, orifice valve 144 may be adjusted such that the flow of hydraulic oil therethrough results in the flow of hydraulic oil to the inlet 126 of motor 80 being maintained at 5-10% less than the flow of hydraulic oil provided to motor 78. By varying the fluid flow through orifice valve 144, hydraulic circuit 142 ensures that motor 80 continues to run slower than motor 78 and that a directional pre-load on the gears 60 is maintained in a constant fashion to pre-load the gears 60 of the gear train 58 into enmeshing engagement with each other in one rotational direction.

Figure 7:
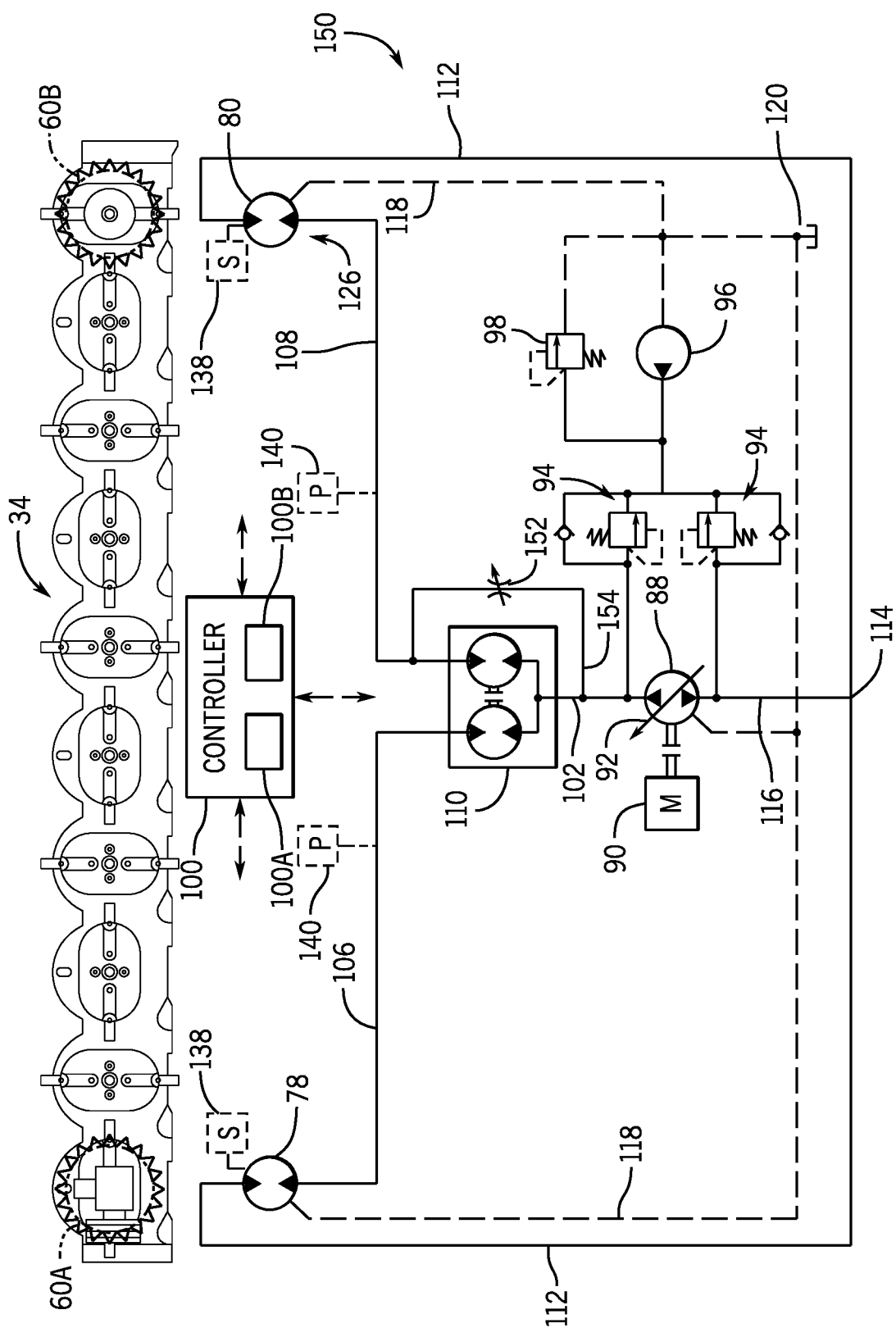
FIG. 7 is a schematic view of another example hydraulic circuit for a cutter control system associated with the cutter assembly of FIGS. 2 and 3.

FIG. 7 illustrates another embodiment of a hydraulic circuit 150. Again, the hydraulic circuit 150 is substantially similar to the hydraulic circuit 86 of FIG. 4, and thus common components of the circuit are identified consistent with those in FIG. 4. In hydraulic circuit 150, the mechanical-type flow divider 110 divides a flow of hydraulic oil provided from platform pump 88 between fluid paths 106, 108, such that equal amounts of hydraulic oil flow along the fluid paths toward the motors 78, 80. In the embodiment of FIG. 7, a (variable) orifice valve 152 is positioned in fluid path 108 that operates to bleed off a portion of the flow of hydraulic oil provided to the second motor 80. The orifice valve 152 is positioned in a bleed-off fluid path 154 that is parallel to or across the flow divider 110. Upon passing through the flow divider 110, a portion of hydraulic oil in fluid path 108 is bled off and diverted back to high-pressure line 102 upstream from tee connection 104. Accordingly, the flow of hydraulic oil in fluid path 108 provided to the inlet 126 of motor 80 can be reduced or restricted as compared to the flow of hydraulic oil in fluid path 106 that is provided to the motor 78.

Similar to the orifice valves of FIGS. 4 and 5, the orifice valve 152 is configured to selectively restrict or control the flow of hydraulic oil therethrough by a desired amount. In one embodiment, the orifice valve 152 is an electronically controlled valve in operable communication with controller 100. The controller 100 operates to adjust the orifice valve 152 responsive to inputs thereto of one or more operational parameters (motor speed, hydraulic circuit pressure(s), etc.), with a transfer function of the controller 100 adjusting the orifice valve 152 responsive to these received inputs. By varying the fluid flow through orifice valve 152, hydraulic circuit 150 ensures that motor 80 continues to run slower than motor 78 to pre-load the gears 60 of the gear train 58 into enmeshing engagement with each other in one rotational direction.

Figure 8:
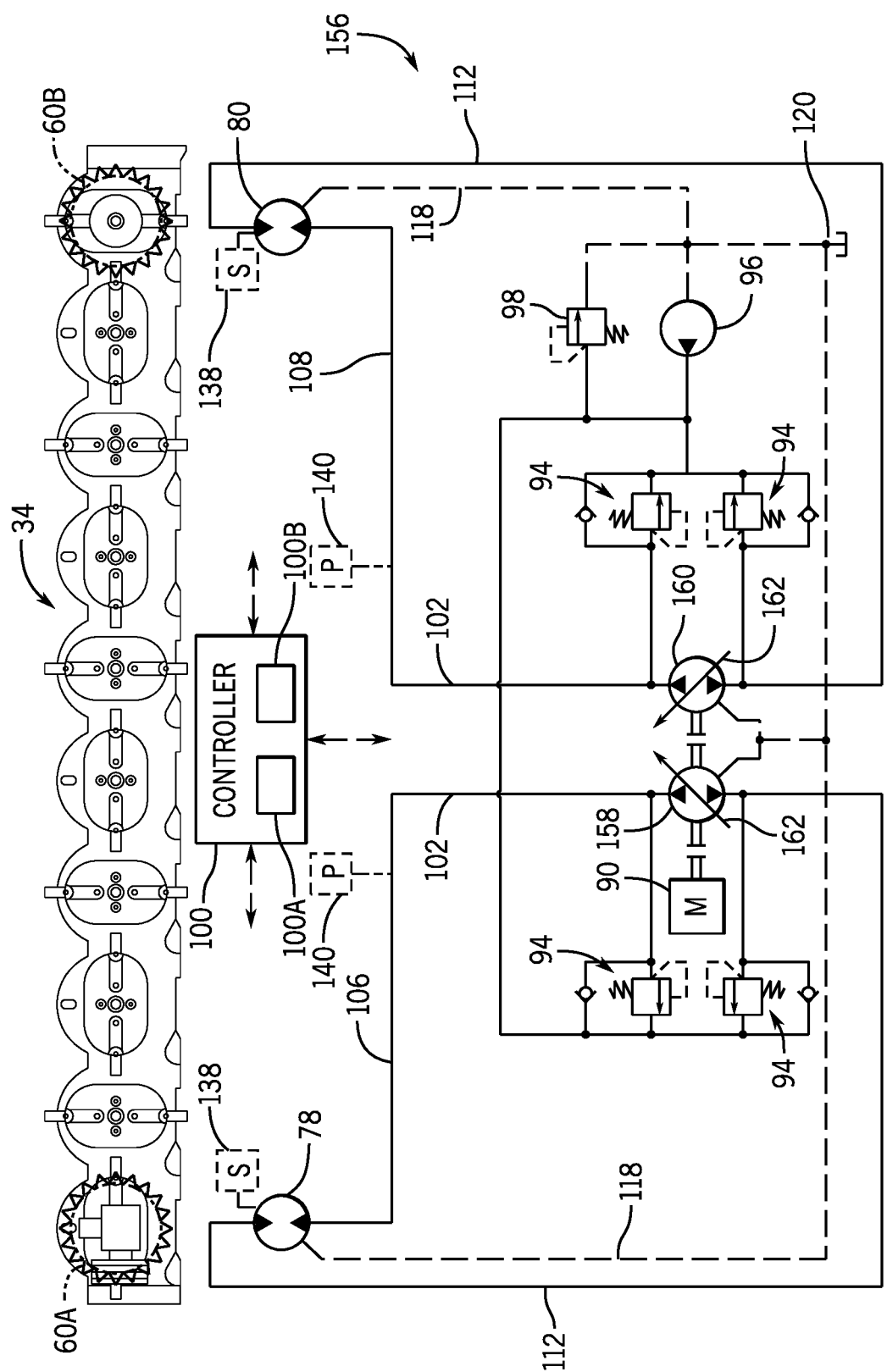
FIG. 8 is a schematic view of another example hydraulic circuit for a cutter control system associated with the cutter assembly of FIGS. 2 and 3.

Referring now to FIG. 8, a hydraulic control system or hydraulic circuit 156 is provided according to another embodiment. The hydraulic circuit 156 includes a pair of onboard platform pumps 158, 160 powered by a motor 90 that may be driven by the engine of the windrower 20 to provide for circulation of hydraulic oil within the hydraulic circuit 156. Each of the platform pumps 158, 160 may be configured as a variable displacement pump operable to provide a controlled amount of hydraulic oil to a respective motor 78, 80 to run the motor according to a desired operation. Each of the pumps 158, 160 may, for example, be a pressure-compensated, load-sensitive pump that includes a swash plate 162 that may be adjustably stroked or destroked to change its angular position and correspondingly adjust the output flow rate of oil therefrom. Other general components of the hydraulic circuit 156 include relief valves 94, charge pump 96, and charge pressure relief 98.

The hydraulic circuit 156 includes a high-pressure line 102 leading from each pump 158, 160 to its respective motor 78, 80, such that a first high-pressure fluid path 106 leads to the motor 78 and a second high-pressure fluid path 108 leads to the motor 80. Return lines 112 lead from the motors 78, 80 back to the backside of each of the respective pumps 158, 160. A case drain line 118 is also connected to each of motors 78, 80 and leads to a reservoir 120 that stores low pressure hydraulic oil.

The variable flow output from each pump 158, 160 is achieved via electronic displacement control of the pumps 158, 160, with increases and decreases in the output flow providing more or less flow to the motors 78, 80, to adjust the speed of the rotary cutters 52 on cutter assembly 34. For providing such electronic displacement control, controller 100 is provided in the hydraulic circuit 156 that is operatively connected to the variable displacement pumps 158, 160 to control the output flow rate of hydraulic oil therefrom. Controller 100 is programmed to control the output flow from the pumps 158, 160 such that the output flow from pump 158 is always greater than the output flow from pump 160. The controller 100 may adjust the output flow from the pumps 158, 160 responsive to inputs received by the controller 100 in the form of an operator input (e.g., via controls in the cab 28) and/or one or more operational parameters that are measured during operation of the hydraulic circuit 156 and the motors 78, 80. For example, sensors may be included in hydraulic circuit 156 that measure one or more of the motor speed of motors 78, 80 and pressure(s) within the hydraulic circuit 156—with speed sensors 138 and pressure sensors 140 generally indicated in dashed lines in FIG. 8, as non-limiting examples. The controller 100 may adjust the output flow rate of one or more of the pumps 158, 160 responsive to the received inputs and to maintain a leader-follower relationship between the speed of the motors 78, 80, i.e., that motor 80 always runs slower than motor 78, to maintain a pre-load on the gears 60 in one rotational direction and thereby prevent gear chatter. As an example, one or more of the variable displacement pumps 158, 160 may be adjusted such that the flow of hydraulic oil provided to motor 80 is 5-10% less than the flow of hydraulic oil provided to motor 78.

Figure 9:
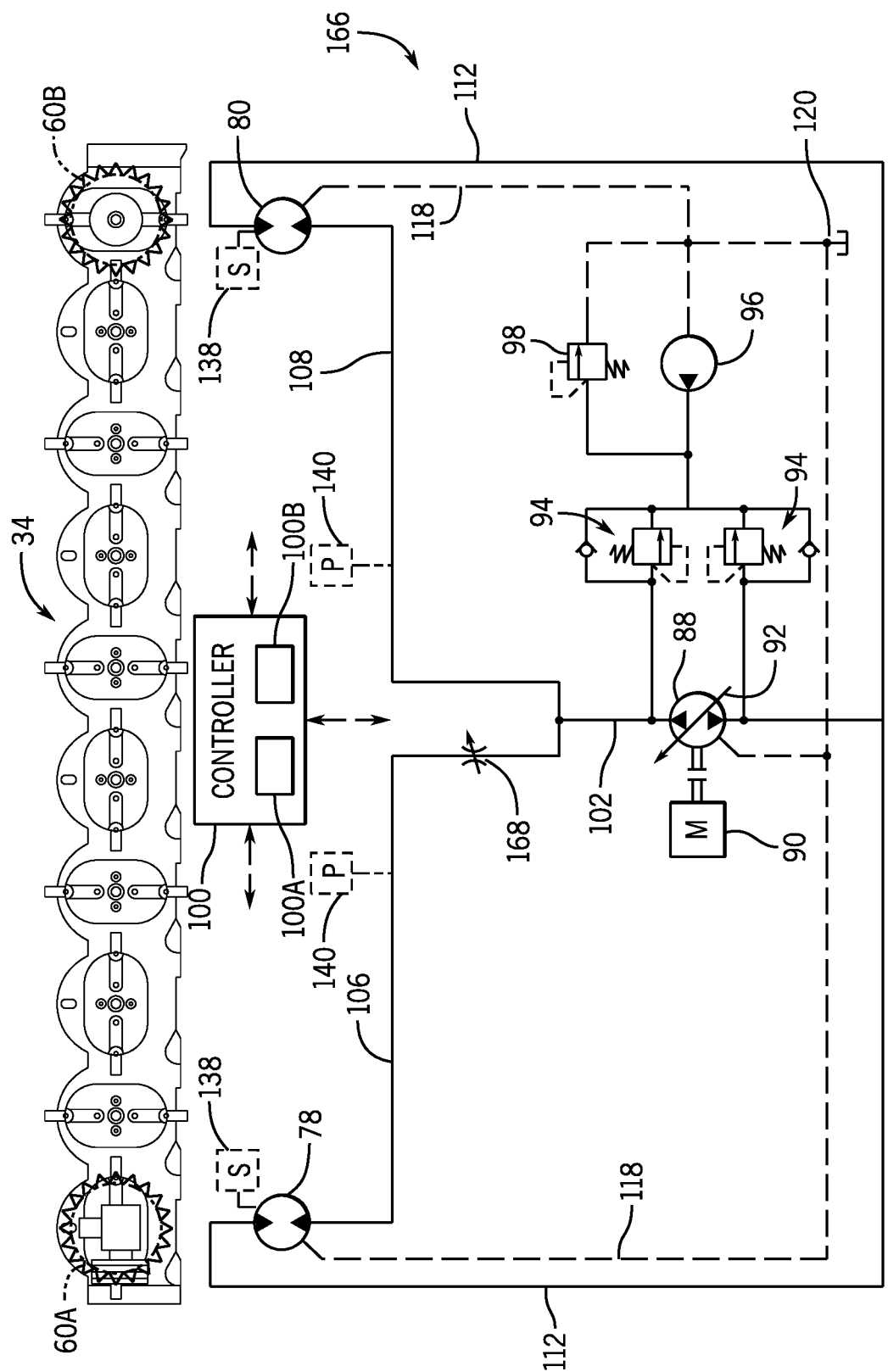
FIG. 9 is a schematic view of another example hydraulic circuit for a cutter control system associated with the cutter assembly of FIGS. 2 and 3.

Another hydraulic circuit 166 is illustrated in FIG. 9, where a high-pressure line 102 leads from a platform pump 88 to a tee connection 104, with one fluid path 106 leading to the motor 78 and another fluid path 108 leading to the motor 80. A priority valve 168 is positioned in fluid path 106 to control the flow of hydraulic oil to motor 78, with priority valve 168 functioning to give motor 78 priority to motor 80 regarding a flow of hydraulic oil thereto. The priority valve 168 may be configured as an electronically controlled valve in operable communication with controller 100. As previously described, controller 100 may adjust the flow through priority valve 168 responsive to inputs received by the controller 100 in the form of one or more operational parameters that are measured during operation of the hydraulic circuit 166 and the motors 78, 80. In operation of hydraulic circuit 166, controller 100 controls the setting of priority valve 168 such that the flow of hydraulic oil provided to motor 78 through the valve is greater (e.g., 5-10% greater) than the flow of hydraulic oil provided to motor 80, with motor 78 thus running at an increased speed as compared to motor 80.

Figure 10:
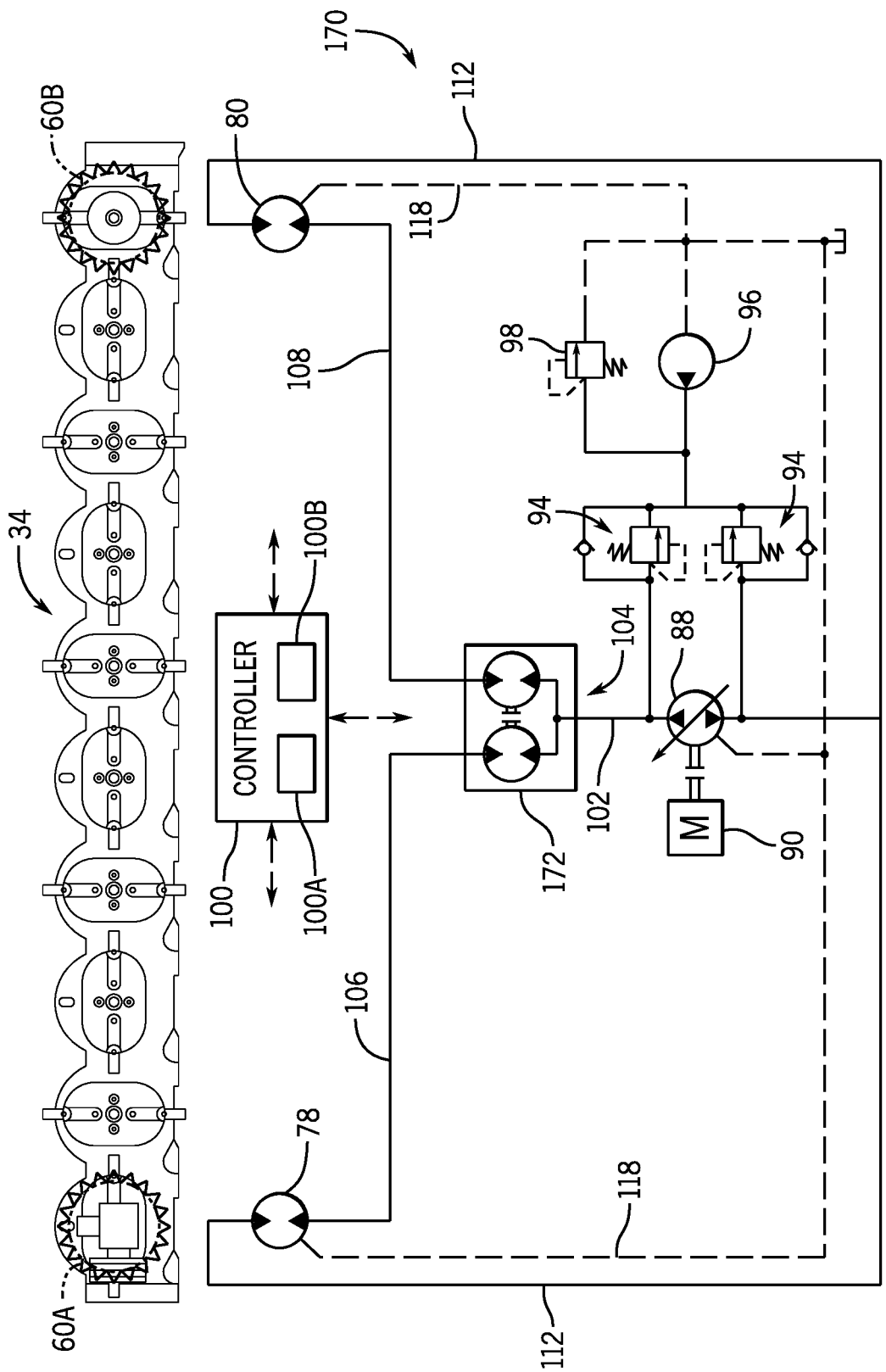
FIG. 10 is a schematic view of another example hydraulic circuit for a cutter control system associated with the cutter assembly of FIGS. 2 and 3.

Another hydraulic circuit 170 is illustrated in FIG. 10, where a high-pressure line 102 leads from a platform pump 88 to a tee connection 104 having a flow divider 172 positioned thereat to divide a flow of hydraulic oil provided from platform pump 88. In the illustrated embodiment, the flow divider 172 divides a flow of hydraulic oil from platform pump 88 between a fluid path 106 that leads to the motor 78 and a fluid path 108 that leads to the motor 80. The flow divider 172 is configured to provide a differential flow between the two fluid paths 106, 108, with the flow divider 172 directing a greater flow of hydraulic oil to motor 78 and a lesser flow of hydraulic oil to motor 80. The division of hydraulic oil between fluid paths 106, 108 may be set at a fixed amount by flow divider 172, with the flow of hydraulic oil provided to motor 80 being 5-10% less than the flow of hydraulic oil provided to motor 78 as an example amount. Motor 80 is thereby caused to run slower than motor 78, which applies a pre-load on the gears 60 of cutter assembly 34 in one rotational direction.

Figure 11:
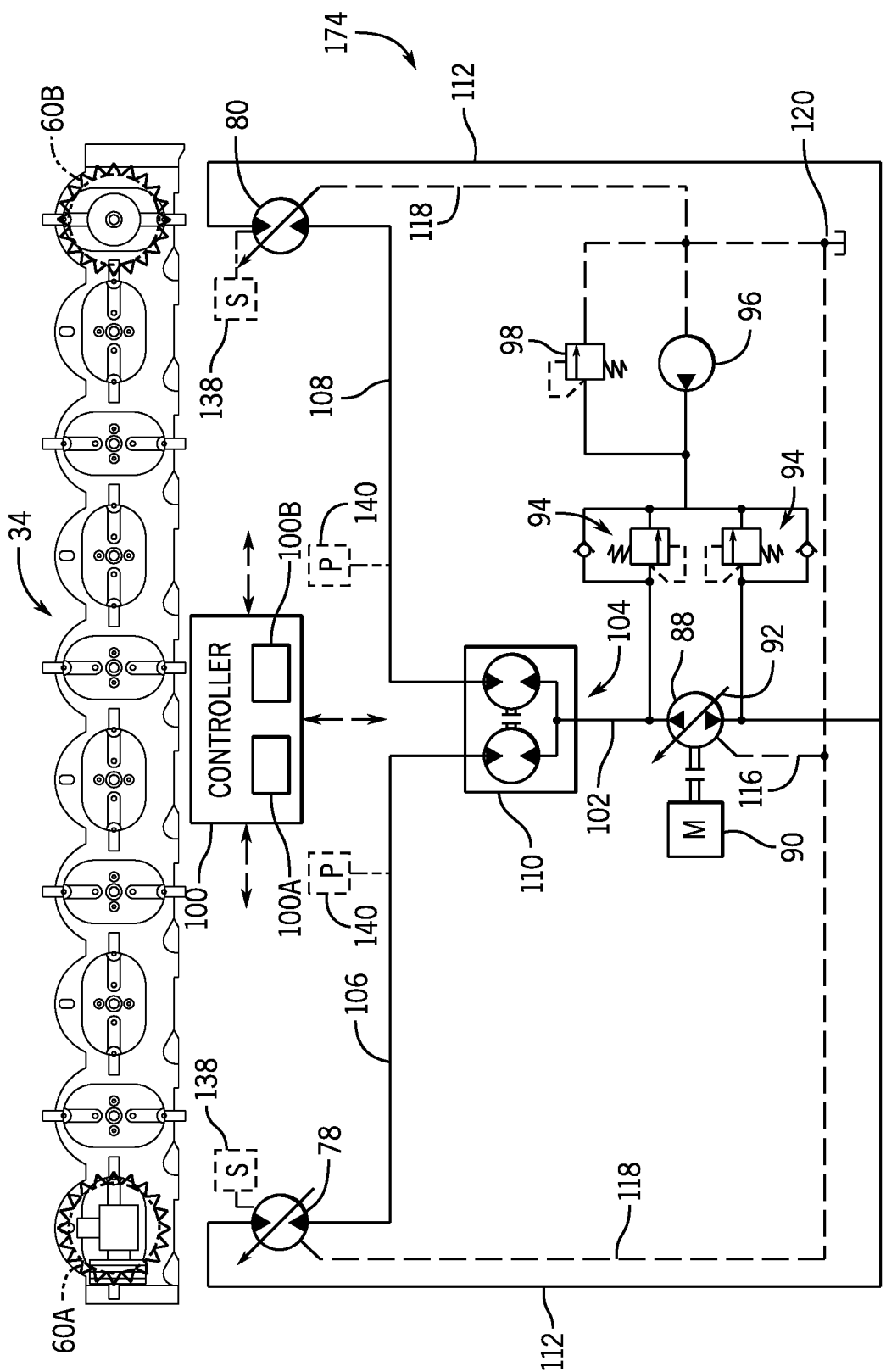
FIG. 11 is a schematic view of another example hydraulic circuit for a cutter control system associated with the cutter assembly of FIGS. 2 and 3.
Figure 12:
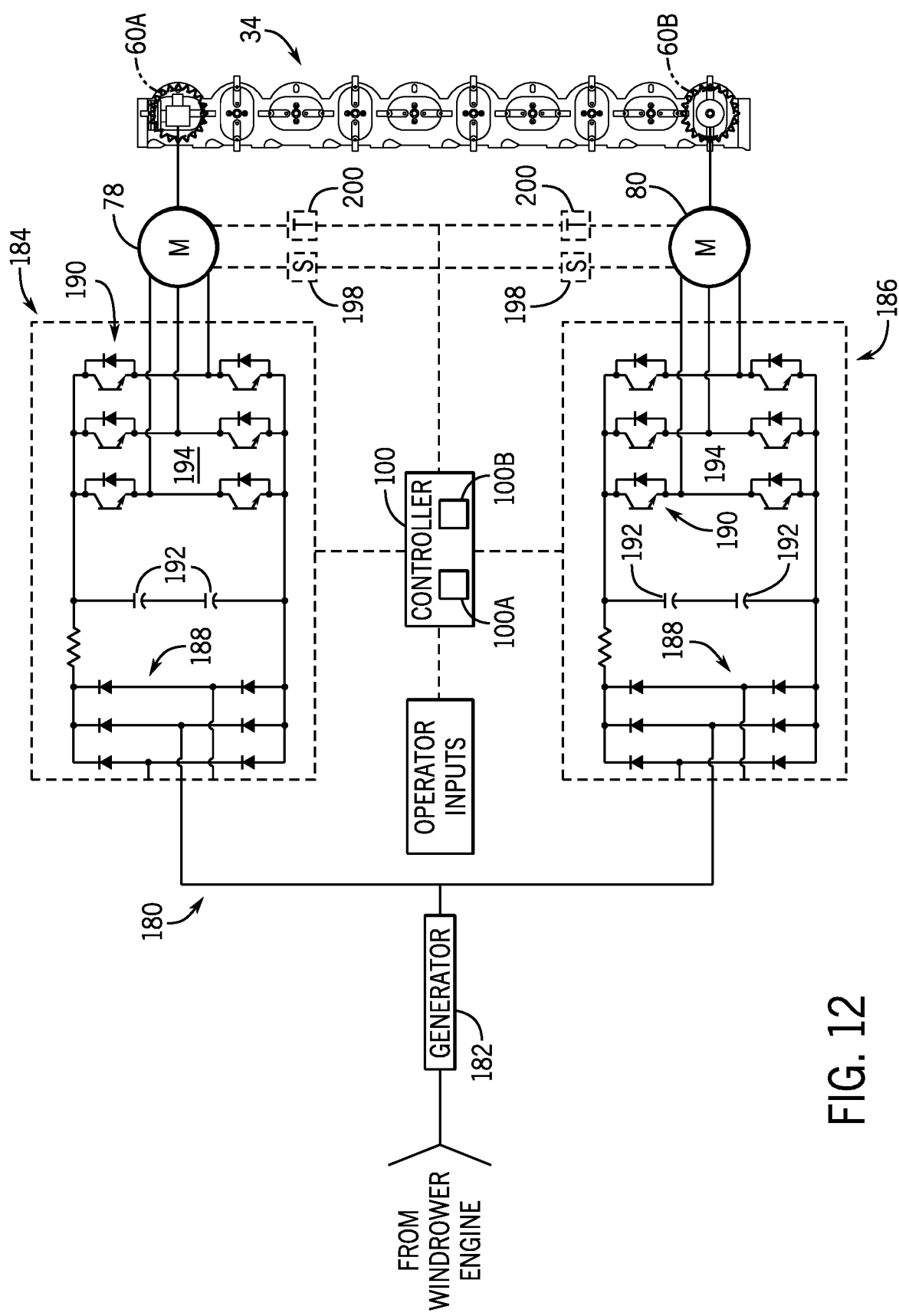
FIG. 12 is a schematic view of an example electrical circuit for a cutter control system associated with the cutter assembly of FIGS. 2 and 3.

Another hydraulic circuit 174 is illustrated in FIG. 11, where motors 78, 80 are provided as variable displacement motors (e.g., variable displacement axial piston motors) that may be selectively controlled to vary the speeds therebetween. A high-pressure line 102 leads from a platform pump 88 to a tee connection 104 having a flow divider 110 positioned thereat to divide a flow of hydraulic oil provided from platform pump 88 between fluid path 106 that leads to the motor 78 and fluid path 108 that leads to the motor 80. The flow divider 110 operates to provide a 50-50 split of the hydraulic oil to the fluid paths 106, 108, such that equal amounts of hydraulic oil flow to each motor 78, 80. The operation of variable displacement motors 78, 80 to drive the rotary cutters 52 of cutter assembly 34 at a desired speed is achieved via electronic displacement control by controller 100. Controller 100 is programmed to control the speed of motors 78, 80 such that the speed of motor 78 is always greater than the speed of motor 80. The controller may adjust the speeds of the variable displacement motors 78, 80 responsive to inputs received by the controller 100 in the form of an operator input (e.g., via controls in the cab 28) and/or one or more operational parameters that are measured during operation of the hydraulic circuit and the motors 78, 80 (motor speeds and pressure(s) within the hydraulic circuit 174). The controller 100 may adjust the speed of one or more of the motors 78, 80 responsive to the received inputs and to maintain a constant relationship between the speed of the motors 78, 80, i.e., that motor 80 always runs slower than motor 78, to pre-load the gears 60 of the gear train 58 into enmeshing engagement with each other in one rotational direction According to other embodiments, the motors 78, 80 in cutter assembly 34 (FIG. 3) are in the form of rotary electric motors 78, 80. Referring now to FIG. 12, and with continued reference to FIGS. 1-3, an electric control system 180 for driving and controlling operation of the electric motors 78, 80 is illustrated. The electric control system 180 receives power from the mechanical motion of the engine in windrower 20 and converts and conditions that power into an electric power suitable for use by the electric motors 78, 80. In electric control system 180, a generator 182 converts mechanical energy from the windrower engine to electric power in the form of alternating current (AC) power. The AC power output from generator 182 is provided to a pair of motor drives 184, 186, with motor drive 184 providing a controlled power input to motor 78 and motor drive 186 providing a controlled power input to motor 80.

In the illustrated embodiment, each of motor drives 184, 186 is an adjustable speed drive (ASD) designed to receive an AC power input from the generator 182, rectify the AC input, and perform a DC/AC conversion of the rectified segment into a three-phase alternating voltage of variable frequency and amplitude that is supplied to its associated electric motor 78, 80. In operation, AC power input from the generator 182 is fed to a rectifier bridge 188 that converts the AC power input to a DC power, such that a DC link voltage is present between rectifier bridge 188 and a switch array 190. The DC link voltage is then buffered or smoothed by a DC link capacitor bank 192 and provided to switch array 190, which includes a series of IGBT switches (for example) and anti-parallel diodes that collectively form a PWM inverter 194. PWM inverter 194 controls IGBT switches to synthesize variable-frequency, variable-amplitude DC voltage waveforms that are delivered to its associated motor 78, 80 following a constant Volts-per-Hertz or vector controls with or without speed/position sensors algorithm. In this regard, the motor drives 184, 186 provide voltage regulation in steady state and fast dynamic step load response over a full load range.

As shown in FIG. 12, controller 100 in electric control system 180 is operatively coupled with the motor drives 184, 186 to provide control functions thereto. Controller 100 is programmed to operate motor drives 184, 186 to provide a controlled power (controlled voltage and/or current) to motors 78, 80 to control the speed (or torque) of the motors for driving rotary cutters 52, such as according to operator inputs (e.g., via controls in the cab 28) received thereby. Additionally, controller 100 is programmed to operate motor drives 184, 186 to provide a controlled power to motors 78, 80 to operate the motors such that the speed (or torque) of motor 78 is always greater than the speed (or torque) of motor 80, such as by a value of 5-10%. To maintain motor 78 at a higher speed (or torque) than motor 80, controller 100 receives one or more operational parameters that are measured during operation of the motors 78, 80. Sensors may be included in electric control system 180 that measure one or more of the speed or torque of motors 78, 80—with speed sensors 198 and torque sensors 200 generally indicated in dashed lines in FIG. 12. The controller 100 may adjust the speed (or torque) of one or more of motors 78, 80 responsive to the received inputs and to maintain a leader-follower relationship between the motors 78, 80 (e.g., that motor 80 always runs slower than motor 78) to pre-load the gears 60 of the gear train 58 into enmeshing engagement with each other in one rotational direction and thereby prevent gear chatter.

A dual motor drive of a cutter assembly included in a harvesting header may be controlled according to a number of methods. A first motor of the dual motor drive is caused to operate at a speed that is greater than a speed of the second motor, and this speed differential between the motors is maintained during operation of the header such that such that the first motor always applies a main driving force to the gear train of the cutter assembly and the second motor always applies a secondary driving force (i.e., braking force) to the gear train of the cutter assembly. The speed differential between the motors causes a directional pre-load to be applied onto the gears of the gear train, and this directional pre-load is maintained during operation of the header. Chatter between the gears is thus prevented, thereby reducing wear on the gears and increasing the longevity thereof.

Embodiments include a hydraulic control system (hydraulic circuit) that controls operation of first and second hydraulic motors of the cutter assembly. Methods for controlling operation of the hydraulic motors of the cutter assembly may be implemented by any of the hydraulic circuits illustrated in FIGS. 4-11. In embodiments, the flow of hydraulic oil to the first motor and second motor of the cutter assembly is controlled via the use of valves (a fixed or variable orifice valve or a priority valve) that restrict the flow of oil to one of the motors or prioritize the flow of oil to one of the motors, to achieve the differential flow of hydraulic oil to the motors. In other embodiments, the flow of hydraulic oil to the first motor and second motor of the cutter assembly is controlled via the use of one or more variable displacement pumps that provide an increased flow of oil to one of the motors, to achieve the differential flow of hydraulic oil to the motors. In other embodiments, the flow of hydraulic oil to the first motor and second motor of the cutter assembly is controlled via the use of a flow divider that diverts differing amounts of oil to the two motors, to achieve the differential flow of hydraulic oil to the motors. In other embodiments, the first motor and second motor of the cutter assembly are variable displacement motors that are operated according to a differential electronic displacement control scheme, such that the first motor operates at a higher speed than the second motor. In embodiments, dynamic control of the hydraulic motors is enabled via the acquisition and analysis of one or more operational parameters of the hydraulic circuit (motor speed, system pressure, etc.), to maintain a desired differential speed relationship between the motors.

Other embodiments have an electric control system that controls operation of first and second electric motors of the cutter assembly. Methods for controlling operation of the electric motors of the cutter assembly may be implemented by the electric control system illustrated in FIG. 12. Power provided to the first and second motors is controlled (via operation of motor drives associated with the electric motors) to operate the motors such that the speed (or torque) of the first motor is always greater than the speed (or torque) of the second motor. In embodiments, dynamic control of the electric motors is enabled via the acquisition and analysis of one or more operational parameters of the motors (motor speed, motor torque), to maintain a desired differential speed relationship between the motors.

ENUMERATED EXAMPLES

The following examples are provided, which are numbered for ease of reference.

1. A work vehicle for cutting crop material includes a header supported by a chassis of the vehicle, with the header including a cutter assembly. The cutter assembly includes, in turn, a cutter bar frame, a series of rotary cutters mounted on the cutter bar frame and arranged in a lengthwise direction, and a gear train having gears coupled to the series of rotary cutters to transfer power thereto. The work vehicle also includes a cutter control system having a first motor coupled to a first gear of the gear train to provide power to the gear train, a second motor coupled to a second gear of the gear train to provide power to the gear train, and a controller, including a processor and memory architecture, operably connected to the first motor and the second motor to control operation thereof. The cutter control system drives the first gear at a first speed via the first motor and drives the second gear at a second speed via the second motor, with the second speed being different than the first speed to pre-load the gears of the gear train into enmeshing engagement with each other in one rotational direction.

2. The work vehicle of example 1, wherein the cutter control system operates the first motor at a first motor speed to apply a main driving force to the first gear and operates the second motor at a second motor speed that is lower than the first motor speed to apply a braking force to the second gear, the main driving force and the braking force generating torque wind-up in the gear train to pre-load the gears.
3. The work vehicle of example 1, wherein the first motor comprises a first hydraulic motor and the second motor comprises a second hydraulic motor, and wherein the cutter control system comprises a hydraulic circuit that provides hydraulic oil to the first hydraulic motor along a first fluid path and to the second hydraulic motor along a second fluid path to drive the respective first and second hydraulic motors.
4. The work vehicle of example 3, wherein the hydraulic circuit is configured to deliver a first flow of the hydraulic oil to the first hydraulic motor and a second flow of hydraulic oil to the second hydraulic motor to cause the first hydraulic motor to operate at the first motor speed and the second hydraulic motor to operate at the second motor speed.
5. The work vehicle of claim 4, wherein the hydraulic circuit includes a flow restriction of the hydraulic oil to the second hydraulic motor.
6. The work vehicle of example 4, wherein the hydraulic circuit further includes a fluid pump to circulate the hydraulic oil, a flow divider to divide the hydraulic oil received from the fluid pump between the first fluid path and the second fuel path, and an orifice positioned in the second fluid path downstream or across from the flow divider to divert a portion of the hydraulic oil in the second fluid path from an inlet of the second motor.
7. The work vehicle of example 6, wherein the orifice comprises an orifice valve that is selectively controllable to vary an amount of the hydraulic oil that is diverted from the inlet of the second motor.
8. The work vehicle of example 7, wherein the controller is programmed to receive an input from one or more sensors in the cutter control system comprising one or more of motor speed, motor load, and hydraulic circuit pressure, and adjust the orifice valve based on the input.
9. The work vehicle of example 3, wherein the hydraulic circuit comprises a first pump to provide a first flow of the hydraulic oil along the first fluid path and a second pump to provide a second flow of the hydraulic oil along the second fluid path, wherein the second flow provided by the second pump is less than the first flow provided by the first pump to cause the first hydraulic motor to operate at the first motor speed and the second hydraulic motor to operate at the second motor speed.
10. The work vehicle of example 3, wherein the hydraulic circuit comprises a fluid pump to circulate the hydraulic oil along the first fluid path and the second fluid path and a priority valve positioned in the first fluid path and operable to selectively increase a flow of hydraulic oil to the first hydraulic motor as compared to a flow of hydraulic oil to the second hydraulic motor, to thereby cause the first hydraulic motor to operate at the first motor speed and the second hydraulic motor to operate at the second motor speed.
11. The work vehicle of example 2, wherein the first motor comprises a first electric motor and the second motor comprises a second electric motor, and wherein the cutter control system comprises motor drives configured to provide controlled power to the first and second electric motors to operate the first electric motor at the first motor speed and operate the second electric motor at the second motor speed.
12. A method of controlling a cutter assembly in a header of a work vehicle for cutting crops includes providing a cutter assembly having a series of rotary cutters coupled to a gear train having a first gear and a second gear and providing a first motor and a second motor to drive the first gear and the second gear, respectively, with the first and second motors operated by a controller. The method also includes driving the first gear at a first speed with the first motor and driving the second gear at a second speed with the second motor, with the first speed being different than the second speed to pre-load the gears of the gear train into enmeshing engagement with other in one rotational direction.
13. The method of example 12, wherein driving the first gear at the first speed comprises operating the first motor at a first motor speed to apply a main driving force to the first gear and wherein driving the second gear at the second speed comprises operating the second motor at a second motor speed that is lower than the first motor speed to apply a braking force to the second gear, the main driving force and the braking force generating torque wind-up in the gear train to pre-load the gears.
14. The method of example 13, wherein the first motor comprises a first hydraulic motor and the second motor comprises a second hydraulic motor, and wherein the method comprises delivering a first flow of hydraulic oil to the first hydraulic motor along a first fluid path and delivering a second flow of hydraulic oil to the second hydraulic motor along a second fluid path to cause the first hydraulic motor to operate at the first motor speed and the second hydraulic motor to operate at the second motor speed.
15. The method of example 12, wherein the first motor comprises a first electric motor and the second motor comprises a second electric motor, and wherein the method comprises providing, via the controller, controlled power to the first and second electric motor to operate the first electric motor at the first motor speed and operate the second electric motor at the second motor speed.

CONCLUSION

The foregoing has thus provided a work vehicle for cutting crop material featuring a header with a cutter assembly having a series of rotary cutters driven by a gear train that receives power from first and second motors of a cutter control system. The cutter control system operates to drive a first gear of the gear train at a first speed via the first motor and drive a second gear of the gear train at a second speed via the second motor, with the second speed being different than the first speed to pre-load the gear train into enmeshing engagement with each other in one rotational direction, thereby reducing or eliminating gear chatter and reducing the wear on the gears associated therewith.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle for cutting crops comprising:
a header supported by a chassis of the work vehicle, the header including a cutter assembly comprising:
a cutter bar frame;
a series of rotary cutters mounted on the cutter bar frame and arranged in a lengthwise direction; and
a gear train coupled to the series of rotary cutters to transfer power thereto, the gear train having a first gear and a second gear;
a cutter control system comprising:
a first motor coupled to the first gear of the gear train to provide power to the gear train; and
a second motor coupled to the second gear of the gear train to provide power to the gear train; and
a controller, including a processor and memory architecture, operably connected to the first motor and the second motor to control operation thereof;
wherein the cutter control system drives the first gear at a first speed via the first motor and drives the second gear at a second speed via the second motor, the second speed being different than the first speed to pre-load the gear train into enmeshing engagement with each other in one rotational direction.

2. The work vehicle of claim 1, wherein the cutter control system operates the first motor at a first motor speed to apply a main driving force to the first gear and operates the second motor at a second motor speed that is lower than the first motor speed to apply a braking force to the second gear, the main driving force and the braking force generating torque wind-up in the gear train to pre-load the gear train.

3. The work vehicle of claim 2, wherein the first motor comprises a first hydraulic motor and the second motor comprises a second hydraulic motor, and wherein the cutter control system comprises a hydraulic circuit that provides hydraulic oil to the first hydraulic motor along a first fluid path and to the second hydraulic motor along a second fluid path to drive the respective first and second hydraulic motors.

4. The work vehicle of claim 3, wherein the hydraulic circuit is configured to deliver a first flow of the hydraulic oil to the first hydraulic motor and a second flow of hydraulic oil to the second hydraulic motor to cause the first hydraulic motor to operate at the first motor speed and the second hydraulic motor to operate at the second motor speed.

5. The work vehicle of claim 4, wherein the hydraulic circuit includes a flow restriction of the hydraulic oil to the second hydraulic motor.

6. The work vehicle of claim 4, wherein the hydraulic circuit comprises:
a fluid pump to circulate the hydraulic oil;
a flow divider to divide the hydraulic oil received from the fluid pump between the first fluid path and the second fluid path; and
an orifice positioned in the second fluid path downstream or across from the flow divider to divert a portion of the hydraulic oil in the second fluid path from an inlet of the second motor.

7. The work vehicle of claim 6, wherein the orifice comprises an orifice valve that is selectively controllable to vary an amount of the hydraulic oil that is diverted from the inlet of the second motor.

8. The work vehicle of claim 7, wherein the controller is programmed to:
receive an input from one or more sensors in the cutter control system, the input comprising one or more of motor speed, motor load, and hydraulic circuit pressure; and
adjust the orifice valve based on the input.

9. The work vehicle of claim 3, wherein the hydraulic circuit comprises:
a first pump to provide a first flow of the hydraulic oil along the first fluid path; and
a second pump to provide a second flow of the hydraulic oil along the second fluid path;
wherein the second flow provided by the second pump is less than the first flow provided by the first pump to cause the first hydraulic motor to operate at the first motor speed and the second hydraulic motor to operate at the second motor speed.

10. The work vehicle of claim 3, wherein the hydraulic circuit comprises:
a fluid pump to circulate the hydraulic oil along the first fluid path and the second fluid path; and
a priority valve positioned in the first fluid path and operable to selectively increase a flow of hydraulic oil to the first hydraulic motor as compared to a flow of the hydraulic oil to the second hydraulic motor, to thereby cause the first hydraulic motor to operate at the first motor speed and the second hydraulic motor to operate at the second motor speed.

11. The work vehicle of claim 2, wherein the first motor comprises a first electric motor and the second motor comprises a second electric motor, and wherein the cutter control system comprises motor drives configured to provide controlled power to the first and second electric motors to operate the first electric motor at the first motor speed and operate the second electric motor at the second motor speed.

12. A method of controlling a cutter assembly in a header of a work vehicle for cutting crops, the method comprising:
providing a cutter assembly having a series of rotary cutters coupled to a gear train having a first gear and a second gear;
providing a first motor and a second motor to drive the first gear and the second gear, respectively, with the first and second motors operated by a controller;
driving the first gear at a first speed with the first motor; and
driving the second gear at a second speed with the second motor;
wherein the first speed is different than the second speed to pre-load the gear train into enmeshing engagement with each other in one rotational direction.

13. The method of claim 12, wherein driving the first gear at the first speed comprises operating the first motor at a first motor speed to apply a main driving force to the first gear and wherein driving the second gear at the second speed comprises operating the second motor at a second motor speed that is lower than the first motor speed to apply a braking force to the second gear, the main driving force and the braking force generating torque wind-up in the gear train to pre-load the gear train.

14. The method of claim 13, wherein the first motor comprises a first hydraulic motor and the second motor comprises a second hydraulic motor, and wherein the method comprises providing hydraulic oil to the first hydraulic motor along a first fluid path and to the second hydraulic motor along a second fluid path, to drive the respective first and second hydraulic motors.

15. The method of claim 14, wherein the method comprises delivering a first flow of the hydraulic oil to the first hydraulic motor and a second flow of hydraulic oil to the second hydraulic motor to cause the first hydraulic motor to operate at the first motor speed and the second hydraulic motor to operate at the second motor speed.

16. The method of claim 15, wherein the method comprises:
dividing a pumped flow of hydraulic oil between the first fluid path and the second fluid path via a flow divider; and
diverting a portion of the hydraulic oil in the second fluid path from an inlet of the second motor, such that the second flow of hydraulic oil is delivered to the second motor.

17. The method of claim 16, wherein diverting the portion of the hydraulic oil comprises positioning an orifice in the second fluid path downstream or across from the flow divider to divert a portion of the hydraulic oil from the inlet of the second motor.

18. The method of claim 17, wherein the method comprises selectively controlling, via the controller, an orifice valve in the second fluid path to vary the portion of hydraulic oil diverted from the inlet of the second motor.

19. The method of claim 15, wherein the method comprises:
operating, via the controller, a first pump to provide the first flow of the hydraulic oil to the first hydraulic motor to cause the first hydraulic motor to operate at the first motor speed; and
operating, via the controller, a second pump to provide the second flow of hydraulic oil to the second hydraulic motor to operate the second hydraulic motor at the second motor speed.

20. The method of claim 13, wherein the first motor comprises a first electric motor and the second motor comprises a second electric motor, and wherein the method comprises providing, via the controller, controlled power to the first and second electric motor to operate the first electric motor at the first motor speed and operate the second electric motor at the second motor speed.

* * * * *